United States Patent [19]

Goddard et al.

[11] Patent Number: 4,993,520
[45] Date of Patent: Feb. 19, 1991

[54] FRICTION PAD ASSEMBLIES

[75] Inventors: Christopher H. Goddard, Usk; Richard E. Thompson, Monmouth, both of Great Britain

[73] Assignee: Lucas Industries public limited company, Birmingham, England

[21] Appl. No.: 343,213

[22] Filed: Apr. 26, 1989

[30] Foreign Application Priority Data

Apr. 27, 1988 [GB] United Kingdom ............... 8809966

[51] Int. Cl.⁵ ............................................. F16D 65/40
[52] U.S. Cl. .............................. 188/73.38; 188/73.1; 188/250 B; 192/308
[58] Field of Search ............... 188/73.38, 73.36, 73.37, 188/73.1, 250 B; 192/30 V

[56] References Cited

U.S. PATENT DOCUMENTS 4,151,899  5/1979  Wright .......................... 188/73.38

FOREIGN PATENT DOCUMENTS

| 248385 | 12/1987 | European Pat. Off. ......... 188/73.38 |
| 2532103 | 2/1977 | Fed. Rep. of Germany ... 188/73.38 |
| 2745947 | 4/1978 | Fed. Rep. of Germany ... 188/73.38 |
| 2461161 | 3/1981 | France .............................. 188/73.38 |

*Primary Examiner*—George E. A. Halvosa
*Attorney, Agent, or Firm*—Scrivener and Clarke

[57] ABSTRACT

The present invention provides a friction pad assembly wherein an edge region of the backing plate has two recesses located symmetrically about a center line (11) of the assembly with a resilient leaf spring secured across each recess (13). In use, in a disc brake retaining pins engage against the springs to hold the assembly in position. This pad assembly design thus minimizes the required space by locating the resilient pad anti-rattle springs within the profile and sides of the backing plate, and by using the necessarily relatively short springs, the tendency for the springs (19) to be buckled or distorted, or affected by heat, is minimized.

8 Claims, 4 Drawing Sheets

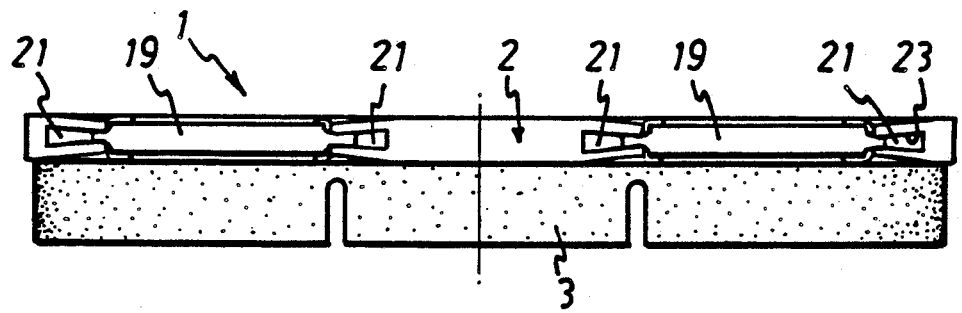
Fig_1
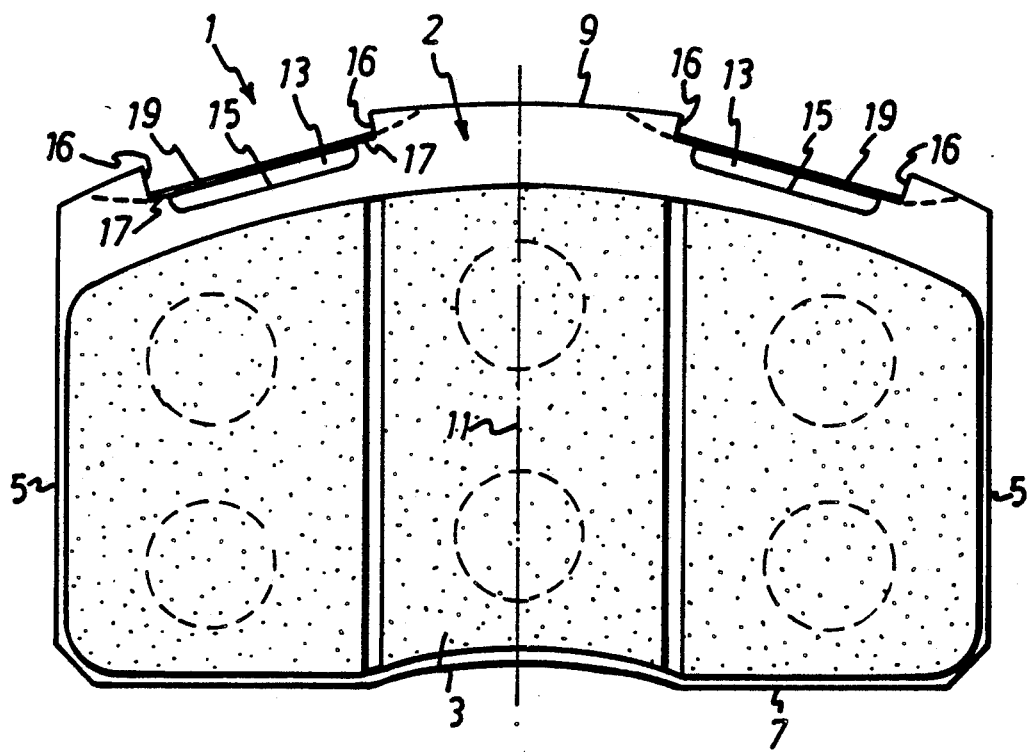
Fig_2

FRICTION PAD ASSEMBLIES

The present invention relates to a friction pad assembly for use in a disc brake, and a disc brake incorporating such a friction pad assembly.

In particular the present invention relates to a friction pad assembly comprising a planar backing plate to which a pad of friction material is secured. To resiliently hold such a friction pad assembly in a disc brake it is known to secure a wire or leaf spring to the backing plate e.g., by a pin, rivet or clip-type arrangement, the spring engaging part of the disc brake and biassing the friction pad assembly against another part of the disc brake. In this way pad rattle is at least reduced. The majority of such springs are attached to the backing plate in a way in which they protrude either radially outwardly of the backing plate, thus increasing the swept form of the pad profile and restricting cooling air flow above the pads, or attached so that they lie to the front or the rear of the backing plate. Any such offset positioning of the spring may of course result in spurious loading of the pad assembly, which may have adverse effects. Furthermore in order to allow for the offset spring arrangement the disc brake, i.e. caliper housing, may have to have cast recesses to accommodate the spring. This all adds to the overall size, complexity and cost of the brake. Also in certain cases the spring is detachable from the backing plate. This is disadvantageous.

It will be appreciated that because of the size of a commercial vehicle disc brake and consequently the size and weight of the friction pads, fairly hefty springs have to be used to prevent unwanted vibration and rattle. Accordingly the above spring arrangements as used on cars have to be made correspondingly bigger to compensate. However these designs do not lend themselves to such an increase in size and the above mentioned problems and disadvantages are amplified.

The aim of the present invention is to provide a friction pad assembly incorporating a pad anti-rattle spring which is located within the confines of the front and rear faces of the backing plate i.e., is not offset, and within the radially outer edge of the backing plate so that the spring does not require special modification of the caliper housing and does not affect the swept profile of the pad assembly, and to also provide a disc brake incorporating such a friction pad assembly.

According to the present invention there is provided a friction pad assembly comprising a backing plate to which a pad of friction material is secured, an edge region of the backing plate having at least two recesses located in spaced relation to one another with a resilient spring located across each recess in the plane of the backing plate.

In a preferred embodiment of the present invention the backing plate has two side edges, an upper edge and a lower edge, the pad assembly resting in a disc brake on its lower edge. The upper edge has two recesses symmetrically located about the centre line or axis of symmetry of the pad assembly. Each recess is stepped at each end to provide a shoulder on which an end region of an elongate leaf spring is supported, the remainder of the leaf spring being thus maintained above the base of the recess. To secure the leaf spring in this position, the said regions of the leaf spring each include a region of reduced width which engages in a respective slot formed in the region of the backing plate contiguous to the recess, the regions of the backing plate defining the slot being bent together to fixedly retain the spring. The leaf spring is thus within the confines of the front and rear faces of the backing plate, i.e., not offset, and radially within the outer edge of the backing plate. Thus the swept form of the pad assembly is minimized and because the spring(s) are so confined the manufacture and machining of the caliper housing may be simplified, i.e. the backing plate can abut a corresponding machined surface on the caliper housing without areas of the housing having to be recessed to accommodate the spring(s).

In use, the above described friction pad assemblies are located in a caliper housing of a disc brake, mechanically or hydraulically actuated, and are held down against supporting surfaces preferably by a U-shaped retention pin which is secured to the caliper housing. Each arm of the U-shaped retention pin engages one of the leaf springs on each friction pad assembly, so as to deflect the leaf spring radially inwardly on assembly, thus loading the friction pad assemblies against the supporting surfaces. Alternatively the U-shaped retention pin may be replaced by two separate pins.

By using a pair of relatively short leaf springs the required optimum loading can be achieved with at least the springs being located within the swept profile of the backing plate, and possibly also the pin or pins when the friction pad assembly is installed in a brake. Further, by utilising two relatively short leaf springs there is only a small thermal effect and a minimal tendency for the springs to buckle or twist.

The concept of two recesses and leaf springs may also be used on a force transmitting member located between an actuator of the brake and the friction pad assembly nearer to the actuator. In this way the previously mentioned U-shaped retention pin or pair of pins can additionally bias the force transmitting member against guide surfaces to avoid unwanted vibration.

The present invention will now be further described, by way of example, with reference to the accompanying drawings, in which:

FIG. 1 is a plan view of a preferred embodiment of the present invention;

FIG. 2 is a front view of the embodiment of FIG. 1;

Figure 4:
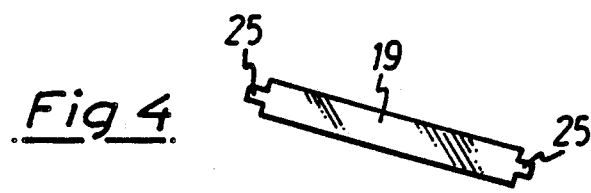
FIG. 4 is a plan view of a leaf spring for use in the embodiment of FIGS. 1 to 3.
Figure 3:
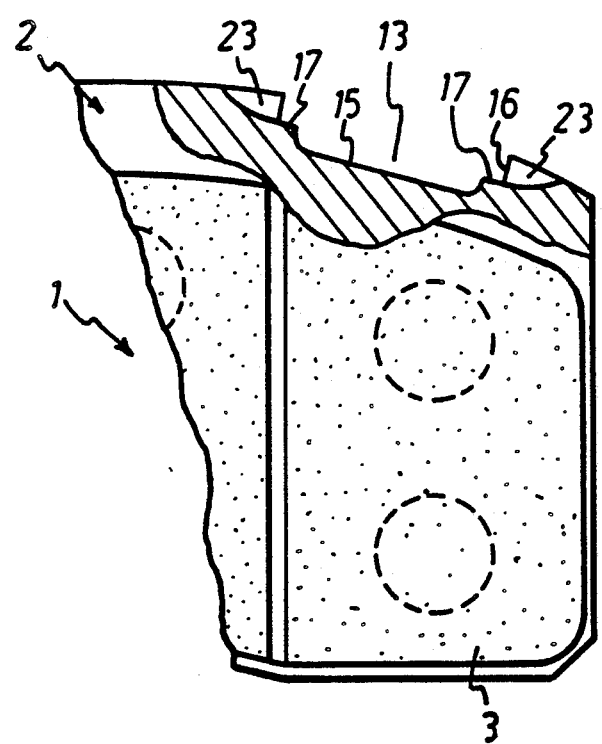
FIG. 3 is a partially cutaway front view of part of the embodiment of FIG. 1.

A preferred embodiment of the present invention is illustrated in FIGS. 1 to 5 of the accompanying drawings. As best seen in FIGS. 1 to 4, this preferred embodiment of friction pad assembly 1 comprises a planar backing plate 2 to which a pad 3 of friction material is secured. The backing plate 2 is generally rectangular (see FIG. 2) and has two parallel side edges 5, a lower edge 7 and an upper edge 9. The friction pad assembly is symmetrical about a centre line 11 and has a recess 13 formed in the upper edge 9 symmetrically on each side of the centre line 11. Each recess 13 extends through the complete thickness of the backing plate 2 and has a base 15 with a stepped region adjacent to each end wall 16, the stepped regions forming shoulders 17 on which the end regions of an elongate leaf spring 19 rest. Each end wall 16 is provided with a slot 21, each slot having facing walls 23. As seen in FIG. 4, the leaf spring 19 has a reduced width region 25 at each end, these reduced width regions 25 each engaging in a slot 21. To retain the reduced width regions 25 in said slots, the facing walls 23 are bent towards each other during manufacture of the friction pad assembly. In this way each leaf spring 19 is supported across a recess 13, above the base 15 thereof.

Figure 5:
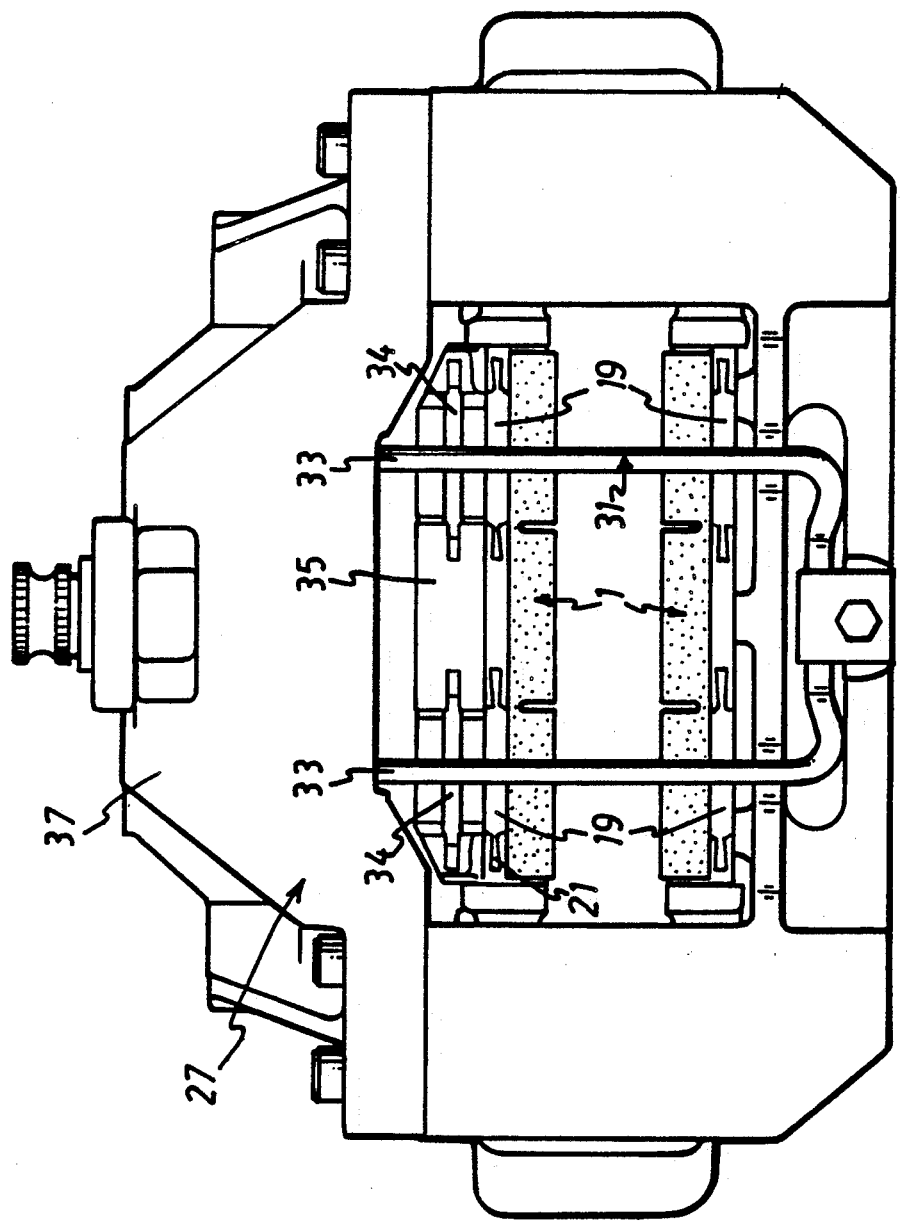
FIG. 5 is a plan view of a disc brake incorporating friction pad assemblies constructed according to FIGS. 1 to 4.
Figure 6:
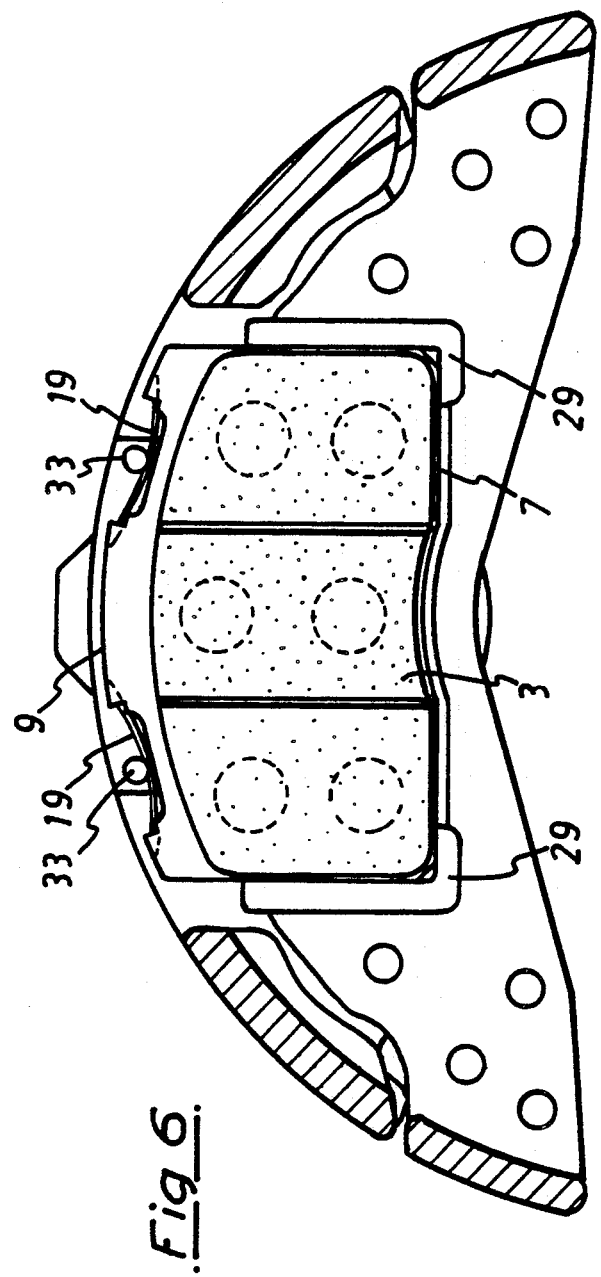
FIG. 6 is a sectional view of part of the brake shown in FIG. 5.

In use, as can be seen in FIGS. 5 and 6, two friction pad assemblies 1 are located in a caliper housing 27 with the side edges and lower edge 7 engaged on supporting surfaces provided by guides 29. The lower edge 7 is loaded against the guides 29 by a U-shaped retention pin 31 which is secured to the caliper housing 27, the U-shaped pin 31 having two arms 33 which each engage and deflect a leaf spring 19 on each of the friction pad assemblies. As an alternative to the U-shaped retention pin 31, two parallel pins secured to the caliper housing can be used.

As can be seen in FIG. 5, the principle of a leaf spring 34 extending across a recess is also used in a force transmitting member 35, the force transmitting member 35 being located between an actuator of the brake, which is located in actuator housing 37, and the friction pad assembly 1 which is nearer to the actuator. The arms 33 of the U-shaped retention pin 31 additionally engage the leaf spring 34 and thus load the force transmitting member 35 against its guides to avoid unwanted vibration.

As will be appreciated from the accompanying drawings, especially FIGS. 1, 2 and 6, the positively secured leaf spring(s) 191, 34 are radially within the profile of the friction pad assembly and within the confines of the front and rear faces of the backing plate 2. Also by using the relatively short leaf springs 19, 34, illustrated, the required optimum loading is achieved and any tendency for the leaf springs to buckle or distort, and/or to be affected by heat, is minimised. The illustrated design also enables the arms 33 of the pin 31 to be within the swept profile of the backing plate 2. The swept profile of the pad assembly is therefore unaffected by the provision of the leaf springs, and the caliper housing of the brake thus requires no specific design. Further, as the springs are not offset with regard to the backing plate, no spurious moments of force are applied to the friction pad assembly.

The present invention thus provides a simple friction pad assembly which is cheap to manufacture and which has clear advantages both by virtue of its operation and by virtue of the fact that no specific brake design features are required.

We claim:

1. A friction pad assembly comprising a planar backing plate having a rear face and a front face to which a pad of friction material is secured, said backing plate having between said faces a pair of side edges, an inner edge and a radially outer edge defining the swept profile of said backing plate, said assembly being symmetrical with respect to a center line thereof, a pair of recesses in said radially outer edge of said backing plate, each being located symmetrically about said center line, each recess having a base, and a resilient spring located across each recess in the plane of said backing plate, said springs being at all times within the radially outer edge of said backing plate as well as being within the swept profile thereof, each recess having support means for end regions of each spring, said support means being constructed and arranged to support a spring above said base, each spring being deflectable towards said base and below said support means.

2. An assembly according to claim 1, wherein at least one recess is spaced from a centre line of the pad assembly.

3. An assembly according to claim 1, wherein each spring is an elongate leaf spring.

4. An assembly according to claim 1, wherein each spring is located within the confines of the front and rear faces of the planar backing plate.

5. An assembly according to claim 1, wherein each spring is located within the confines of the edge region of the backing plate.

6. A disc brake incorporating a friction pad assembly according to claim 1, wherein a retaining pin engages against each resilient spring to resiliently hold the friction pad assembly in position in the brake.

7. An assembly according to claim 1 wherein said support means comprise steps at each end of each of said recesses to provide shoulders on which said end regions of each spring are supported, the remainder of each spring between said shoulders being maintained by said shoulders above said base of a respective recess so as to be deflectable towards said base and below said shoulders.

8. An assembly according to claim 7, wherein the ends of the recesses adjacent said shoulders are each provided with a slot into which an end portion of each of the springs engages, the sides of the slot being deformed to retain the spring in position.

* * * * *